United States Patent [19]

Wearing

[11] Patent Number: 4,574,513
[45] Date of Patent: Mar. 11, 1986

[54] COLLAPSIBLE NET ASSEMBLY

[76] Inventor: John F. Wearing, 3467 Williamsburg, Boise, Id. 83706

[21] Appl. No.: 700,491

[22] Filed: Feb. 11, 1985

[51] Int. Cl.⁴ ............................................ A01K 77/00
[52] U.S. Cl. ...................................................... 43/12
[58] Field of Search ............................................ 43/12

[56] References Cited

FOREIGN PATENT DOCUMENTS

| 255336 | 1/1949 | France | 43/12 |
| 598315 | 2/1948 | United Kingdom | 43/12 |
| 1040338 | 8/1966 | United Kingdom | 43/12 |
| 1249298 | 10/1971 | United Kingdom | 43/12 |
| 1521634 | 8/1978 | United Kingdom | 43/12 |

Primary Examiner—Nicholas P. Godici
Assistant Examiner—M. Jordan
Attorney, Agent, or Firm—Paul F. Horton

[57] ABSTRACT

Collapsible net apparatus including a handle; a T-member having laterally spaced openings; a slide member slidably engaging the handle; a pair of arms pivotally connected to the slide member and slidably received within the openings of the T-member, the arms divergently extended or convergently retracted upon movement of the slide member; a latch member for holding the arms in an extended position; a net support extending between the free end of the arms; and a net stranded about the arms, support member, and connected to the T-member. Hook members at the free end of each arm gather the net strands during collapse of the device to maintain proper placement for the operational mode, and a hook located at the end of the handle, engageable with the net, restrains and holds the net in place during the collapsed storage mode.

7 Claims, 10 Drawing Figures

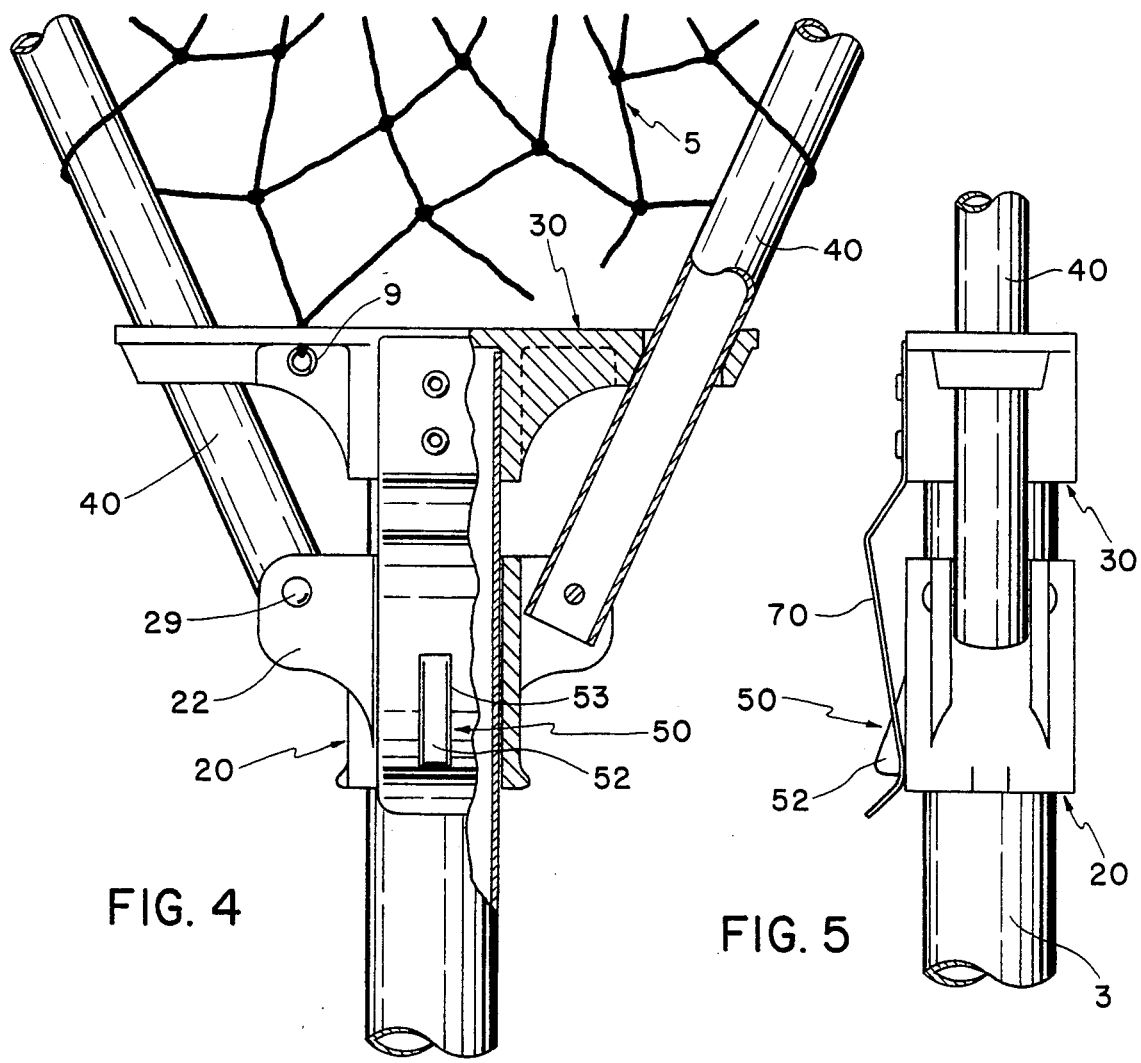
FIG. 4
FIG. 5
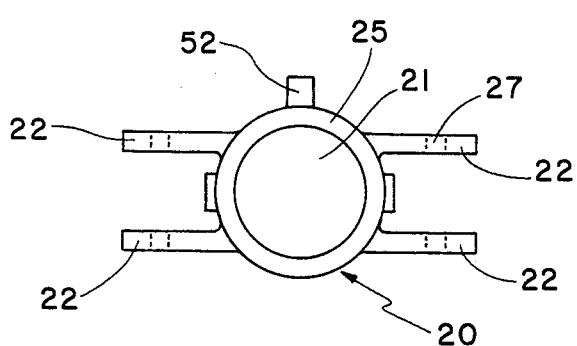
FIG. 6

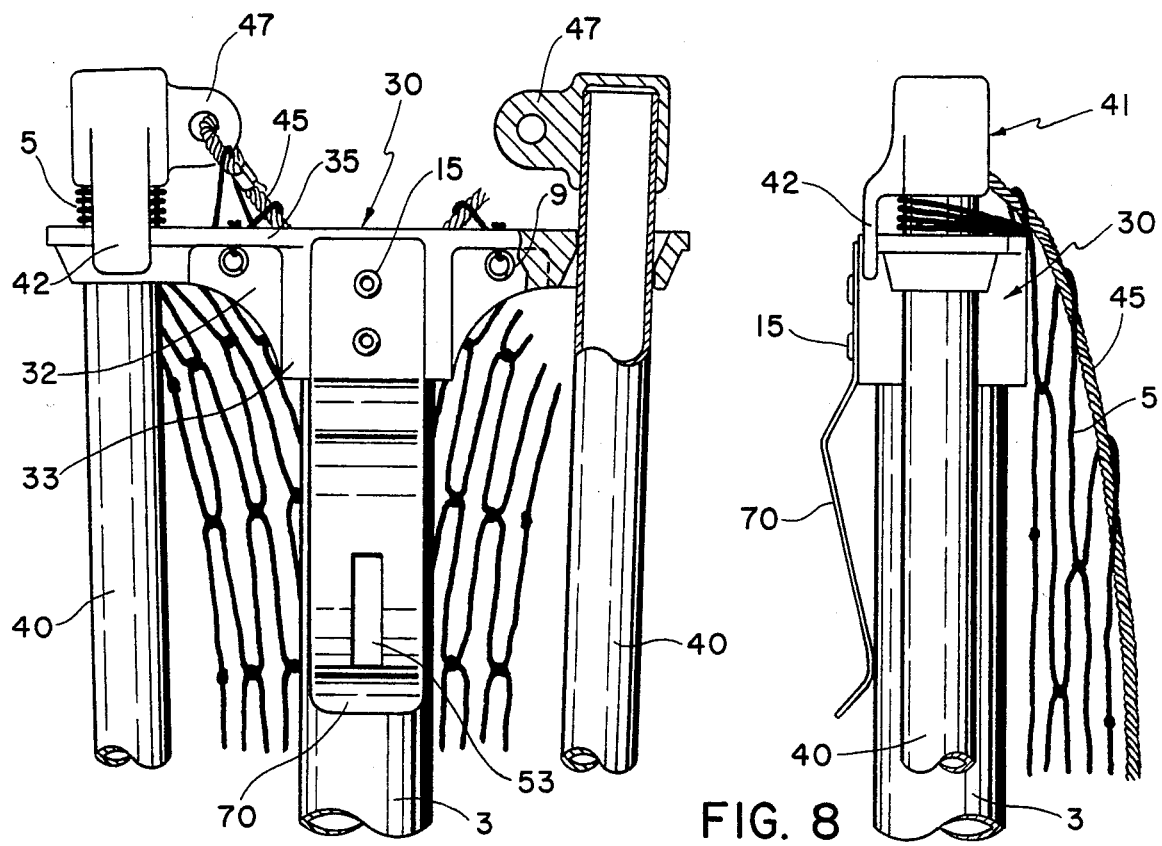
FIG. 7
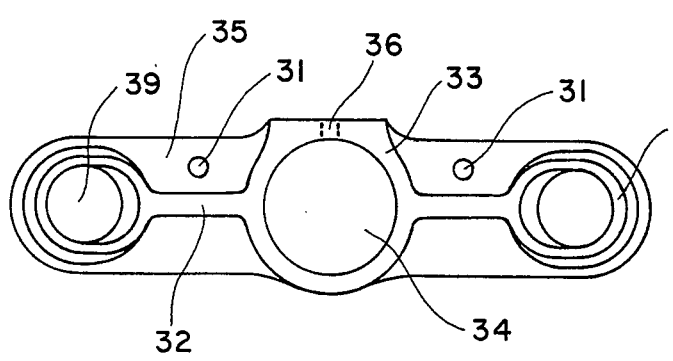
FIG. 9
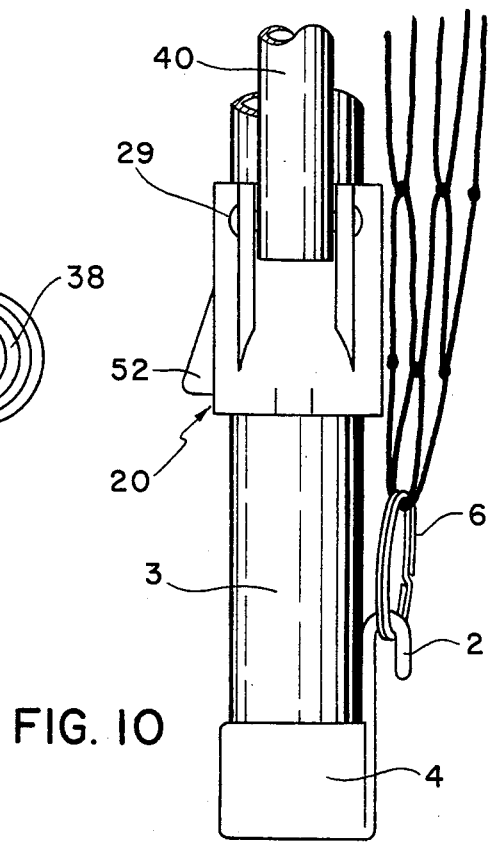
FIG. 8
FIG. 10

COLLAPSIBLE NET ASSEMBLY

BACKGROUND OF THE INVENTION

1. Field of the Invention

The present invention relates to the netting art in general and, more particularly, to collapsible nets used for fishing.

2. Description of the Prior Art

The desirability of a collapsible net has long been recognized because of portability and space considerations. In response to this need, many types of collapsible nets have been devised. Generally, the devices fall into three general categories, namely those having net support arms which are hinged to one another as typified by U.S. Pat. No. 407,709 issued to C. E. White, U.S. Pat. No. 1,886,559 issued to C. F. Larzelere, U.S. Pat. No. 3,815,272 issued to G. E. Marleau, and U.S. Pat. No. 4,138,790 issued to W. A. Schmucker; those having telescoping arm sections as typified by U.S. Pat. No. 1,490,048 issued to C. Voelker and the Schmucker patent; and those having flexible arms such as the White, Voelker, and Schmucker devices. An additional type of device utilizing arms which are pivotal backwards relative to the handle is disclosed by D. E. Bell, U.S. Pat. No. 2,491,703. Those devices utilizing hinged arms are inherently weak at the hinge junction, require special manipulation of the hinges, are not readily collapsible, and are for the most part ungainly. Those devices having telescoping sections also require special manipulation and are also ungainly. Those devices having flexible arms lack the necessary rigidity for proper support. The device of Bell, when used to support a net for which it is intended, requires much inconvenient manipulation of the net during operation. Additional problems with existing devices is the need for net removal for storage or the presence of an uncontrolled, unrestrained net resulting in unwanted snagging or tearing of the net.

SUMMARY OF THE INVENTION

The present invention overcomes the foregoing problems in providing a collapsible net apparatus having arm members which are rigid and which are retractable through openings in a T-member for placement substantially parallel and side by side with the handle during the collapsed storage mode, with the net itself being restrained by net engagement means disposed on the handle. A full and comprehensive definition of the apparatus may be found in the appended claims.

It is therefore a primary object of the present invention to provide collapsible net apparatus having rigid net carrying arm members which may be divergently extended for the operational mode and convergently retracted for placement by the handle for the storage mode by the simple movement of a lockable slide member on the handle.

It is another object of the present invention to provide a collapsible net apparatus having a net engagement means for controlling the net during the storage mode.

Another important object of the present invention is to provide collapsible net apparatus having retractable arms, each arm including a net gathering hook to maintain net placement upon the arms during extension and retraction of the arms.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 4 is a plan view of the T-member and slide member in partial section with the apparatus in the operational mode.

FIG. 5 is a side view of the T-member and slide member with the net in the operational mode.

FIG. 6 is an end view of the slide member.

FIG. 7 is a plan view in partial section, of the T-member with the apparatus in the collapsed mode.

FIG. 8 is a side view of the T-member with the apparatus in the collapsed mode.

FIG. 9 is an end view of the T-member.

FIG. 10 is a side view of the slide member with the apparatus in the collapsed mode.

DETAILED DESCRIPTION OF THE INVENTION

Figures 1, 2, 3:
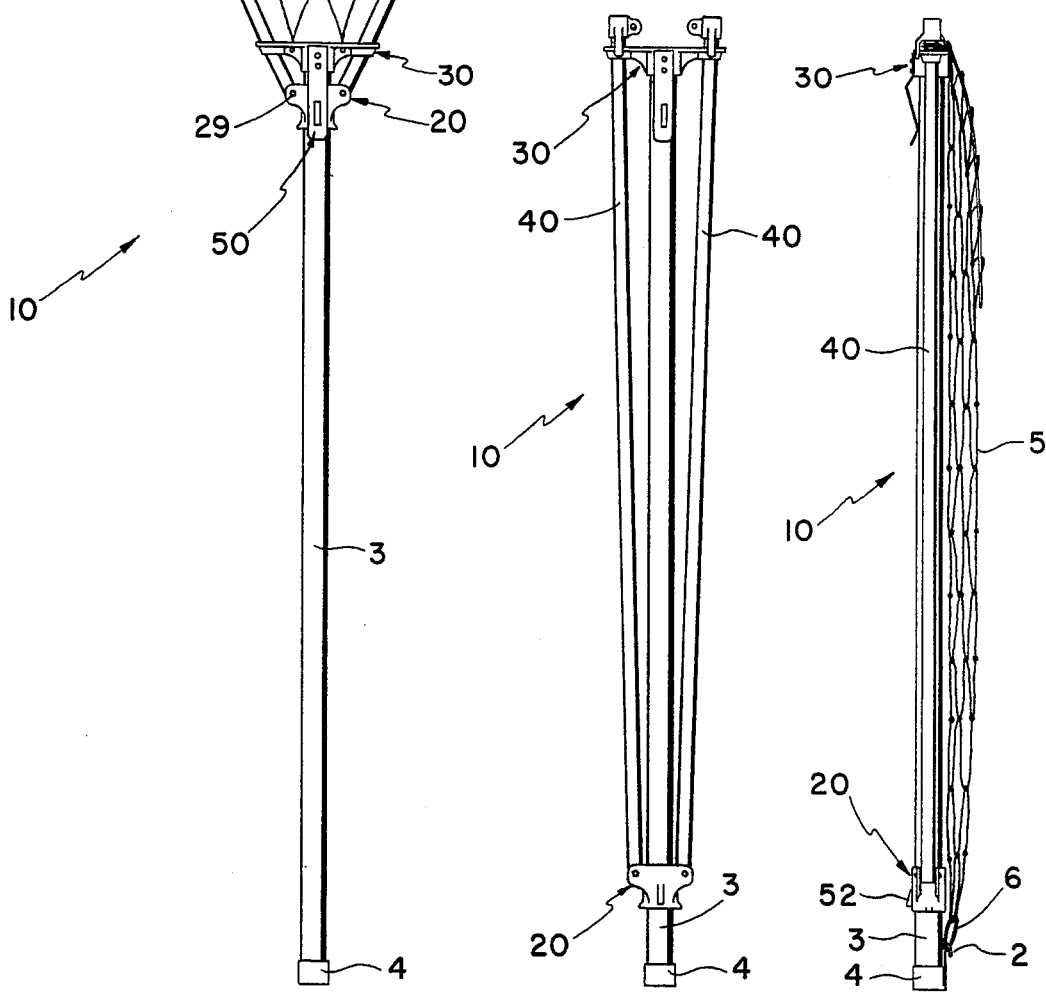
FIG. 1 is a plan view of the collapsible net apparatus of the present invention shown in the open operational mode.
FIG. 2 is a plan view of the apparatus in the closed collapsed mode with net and cord omitted for clarity.
FIG. 3 is a side view of the apparatus in closed mode showing the net in a restrained position.

Referring now to the drawings and more particularly to FIGS. 1-3, an embodiment to be preferred of a collapsible net assembly 10 made according to the present invention is disclosed. Net assembly 10 includes a handle 3, a slide member 20, a T-member 30, a pair of arms 40, latch means designated generally by the numeral 50, net support means 45, and a net 5.

Handle 3 is preferably constructed of tubular aluminum, circular in cross section. While the handle may be constructed of telescoping tubes, a singular tube is preferred. A hand grip, not shown, is optional. It is preferred that handle 3 be provided with an end cap 4 having a net engagement means 2 in the form of a hook as shown to advantage in FIGS. 3 and 10, for storage and retention of the net during the collapsed mode. Engagement means 2, while shown in the form of a hook, may likewise be in the form of mating hook and loops as marketed under the trademark Velcro, a simple rubber band, a strap, and other adjustable or tensioned hooking devices, not shown, and may be made a part of the handle rather than cap 4.

Slidably engaging handle 3 is a slide member 20, shown in detail in FIGS. 4 and 6. Slide member 20 is preferably constructed of moulded plastic or aluminum and includes a tube 25 which defines a central aperture 21 having a diameter slightly larger than handle 3 for engagement therewith. Slide 20 is provided with two pairs of opposing flanges 22 provided with holes 27 for insertion of pins, bolts or rivets 29 for pivotal engagement with arms 40. Slide member 20 is also provided with a male catch member, projection 52, a portion of latch means 50, as will hereinafter be explained.

Affixed to the end of handle 3 opposite end cap 4 is a T-member 30. T-member 30 may also be constructed of high impact plastic or aluminum and is shown to advantage in FIG. 9. T-member 30 includes a tubular stalk 33 defining a central aperture 34 which tightly engages the end of handle 3 and a cross member 35 defining a pair of sleeves 38 the interior surface of which slidingly engage arms 40. Sleeves 38 preferably define openings 39 which are divergent to one another for divergent, yet snug, extension of the arms for the operational mode. Cross member 35 is supported by a cross support 32 for strength and may include a pair of laterally spaced openings 31 for attachment of net 5. The T-member is preferably integral in construction. Tubular stalk 33 may include a pair of transverse openings 36 for receiving bolts, screws or rivets 15 for securing the T-member to the handle. In the preferred embodiment, bolts, screws or rivets 15 also provide the means for attachment of belt clip 70, shown in FIGS. 7 and 8. Belt clip 70 may be constructed of spring steel and includes a slot 53 as a portion of latch means 50. Slot 53 is adapted to receive projection 52 of slide member 20 for holding the slide in a fixed position for extension of arms 40.

Arms 40 are preferably constructed of aluminum tubing, also circular in cross section. Each of the two arms are connected to and pivoted upon a slide member 20, as by pins, rivets, or bolts 29 and each arm extends through sleeve 38, being slidably received within a respective opening 39. Each of the arms may be provided with an end assembly 41, including a net gathering hook 42 for gathering the strands of net 5 which engage each of the arms 40, as shown to advantage in FIGS. 7 and 8, and cord eyes 47 for connection of net support means 45. Assemblies 41 may be attached to the free ends of each of the arms 40 by frictional engagement, glue, welding, or otherwise.

Net support means 45 provides a support for the strands of net 5 when in the operational mode as shown in FIG. 1. While the support means could be a cable, chain, inflexible removable member, or inflexible collapsing member, a simple flexible cord is preferred. Support means 45 is connected between the free ends of arms 40, preferably by cord eyes 47 as previously stated.

While latch means 50, in the preferred embodiment, includes a projection 52 of slide member 20 receivable within a slot 53 of T-member clip 70, it is obvious that the structure may be reversed or that many devices could be similarly usable and the term "latch means" as used in the specifications and claims is to be given broad interpretation.

Net 5 may be of any suitable construction. It is contemplated that a fishing net constructed of cotton or nylon will be the primary type of net used. The net is formed to engage arms 40, support means 45, and to be attached to T-member 30 by means of aperture 31, FIG. 9, to form a triangularshaped net. The net may be held to the T-member 30 by means of snap rings 9. The net may be provided with a ring 6 at its apex for attachment to hook 2 during the collapsed mode to restrain the net.

In operation, and assuming the net assembly 10 is in the collapsed storage mode as shown in FIG. 3, the net assembly is brought to the open, operational mode as shown in FIG. 1, by detaching net 5 from engagement means, hook 2, by slipping ring 6 from the hook and then by sliding slide member 20 up handle 3 until latch projection 52 engages slot 53 of clip 70 to hold the slide member in place. In moving slide member 20 from the collapsed mode shown to advantage in FIGS. 3 and 10 to the open, operational mode, each of the arms 40, which pivotally engage the slide, are moved through respective openings 39 of sleeves 38 to an extended divergent position as shown in FIG. 1. Support cord 45 becomes taut and the net is opened. To then bring assembly 10 to the collapsed mode, spring clip 70 is lifted to detach latch projection 52 from slot 53 and slide member 20 is slid down the handle to retract each of the arms 40. In retracting the arms, each of the hooks 42 of assemblies 41 engage the net strands to gather the strands, as shown in FIGS. 7 and 8. Without the hooks, the strands would slip over support cord 45 and would then require hand manipulation to replace them upon the arms when assembly 10 was returned to the operational mode. It is to be noted that openings 39 of sleeves 38 of T-member 30 are of sufficient size to allow the arms 40 to converge during retraction so as to be substantially parallel to handle 3 and to each other in the collapsed mode, as shown in FIG. 2. Once the arms are fully retracted, net ring 6 is again attached to hook 2 to restrain the net and to keep the net assembly 10 in the collapsed storage position.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Collapsible net apparatus comprising:
   a handle;
   a T-member provided with a pair of laterally spaced openings, said T-member affixed to one end of said handle;
   a slide member slidably engaging said handle;
   a pair of rigid arms, one end of each of said arms pivotally engaging said slide member and movable therewith, each of said arms slidably received within a respective opening of said T-member for divergent extension of said arms for operation and convergent retraction of said arms for storage, and each of said arms including a hook mounted on the end opposite said pivot end and extending toward said pivot for gathering arm engaging strands of a net during retraction of said arms;
   latch means for holding said arms in an extended position for operation;
   support means connected between opposing ends of said arms for supporting a net; and
   a net engaging said T-member, said arms, and said support means.

2. The apparatus as described in claim 1 wherein said handle includes adjacent its free end net engagement means for engaging said net during the collapsed mode for storage.

3. The apparatus as described in claim 2 wherein said net engagement means comprises a hook.

4. The apparatus as described in claim 1 wherein said latch means comprising a first mating member mounted on said slide member and a second mating member mounted on said T-member, said first and second member lockingly engagable with one another.

5. The apparatus as described in claim 4 wherein said first mating member defines a projection and wherein said second mating member defines a belt clip having a recess operable to receive said projection.

6. The apparatus as described in claim 1 wherein said support means comprises a flexible connector.

7. The apparatus as described in claim 6 wherein said flexible connector comprises a cord.

* * * * *